(12) United States Patent
Kloeppel et al.

(10) Patent No.: US 8,976,488 B1
(45) Date of Patent: Mar. 10, 2015

(54) RE-ENFORCED MOTOR HUB FLANGE

(71) Applicant: Western Digital Technologies, Inc., Irvine, CA (US)

(72) Inventors: Klaus Kloeppel, Royal Oaks, CA (US); Ronald G. Ilgan, Santa Clara, CA (US); Mark S. Seymour, Felton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/017,715

(22) Filed: Sep. 4, 2013

Related U.S. Application Data

(60) Provisional application No. 61/857,983, filed on Jul. 24, 2013.

(51) Int. Cl.
G11B 17/028 (2006.01)
G11B 19/20 (2006.01)

(52) U.S. Cl.
CPC .................................. G11B 19/2045 (2013.01)
USPC ..................................................... 360/99.12

(58) Field of Classification Search
USPC .................................. 360/99.12, 99.16, 99.08
See application file for complete search history.

(56) References Cited

U.S. PATENT DOCUMENTS

| | | | |
|---|---|---|---|
| 4,739,427 A | 4/1988 | Kilmer et al. | |
| 5,278,709 A | 1/1994 | Thornton et al. | |
| 5,917,677 A | 6/1999 | Moir et al. | |
| 6,185,067 B1 * | 2/2001 | Chamberlain | 360/99.08 |
| 6,208,486 B1 | 3/2001 | Gustafson et al. | |
| 6,575,634 B2 * | 6/2003 | Nottingham | 384/110 |
| 6,754,044 B1 * | 6/2004 | Braunheim et al. | 360/244.6 |
| 6,888,698 B1 | 5/2005 | Berding et al. | |
| 7,020,884 B2 * | 3/2006 | Choi et al. | 720/613 |
| 7,983,015 B2 * | 7/2011 | Yang et al. | 361/220 |
| 8,416,522 B1 | 4/2013 | Schott et al. | |
| 2003/0117928 A1 * | 6/2003 | Choi et al. | 369/75.2 |
| 2004/0252409 A1 | 12/2004 | Fu et al. | |
| 2006/0126220 A1 | 6/2006 | Okamoto et al. | |

* cited by examiner

Primary Examiner — Allen T Cao

(57) ABSTRACT

A hub for a disk drive assembly including an upper member formed of a first material; and a lower member formed from a second material that supports and reinforces the upper member. The second material has a rigidity greater than the rigidity of the first material. Additionally, a disk drive assembly may be performed by combining a hub, a disk media mounted to the hub and a clamping mechanism attached to the hub and providing a clamping force to the disk media.

20 Claims, 5 Drawing Sheets

Overview of Drive

Overview of Drive

RE-ENFORCED MOTOR HUB FLANGE

CROSS REFERENCE TO RELATED APPLICATION

This application claims the benefit of U.S. provisional application No. 61/857,983, filed Jul. 24, 2013, the disclosure of which is hereby incorporated by reference.

FIELD

The present disclosure relates generally to information storage devices and, in particular, to a motor hub flange for an information storage device.

BACKGROUND

Disk drives frequently include a spindle motor, one or more disk media (henceforth "disks"), and one or more clamping elements. In currently shipping hard drives, the disks are clamped against a support flange on the spindle motor. Sometimes, this clamping force is sufficient to cause the flange to deform the flat disk shape. This effect may be combated by increasing the thickness of the motor hub flanges such that they are thick enough to minimize these affects to manageable levels. However, increasingly smaller disk drive design requirements result in a pressure to reduce the Z-height of all components, including the motor hub flanges such that increasing the thickness of the motor hub flanges is becoming less feasible.

Implementations of the present application may include a motor hub flange providing a reinforcing portion.

BRIEF DESCRIPTION OF THE DRAWINGS

A general architecture that implements the various features of the disclosure will now be described with reference to the drawings. The drawings and the associated descriptions are provided to illustrate implementations of the disclosure and not to limit the scope of the disclosure. Throughout the drawings, reference numbers are reused to indicate correspondence between referenced elements.

DETAILED DESCRIPTION

Figure 1:
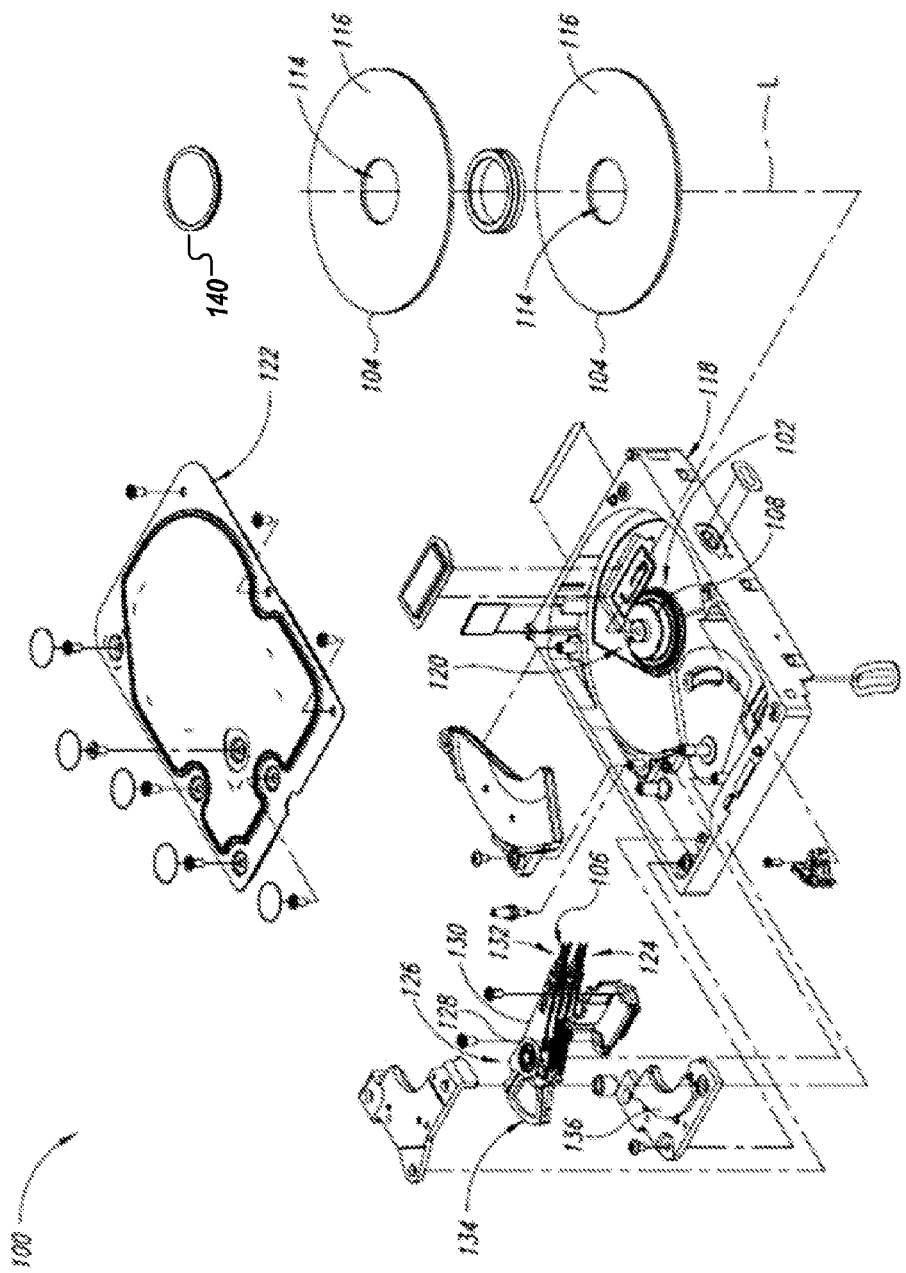
FIG. 1 illustrates a disk drive which may incorporate a hub flange according to one or more implementations of the present application.

Referring to FIG. 1, a disk drive 100 is illustrated which may incorporate a hub flange according to one or more implementations. The disk drive 100 comprises a hub 102 (300, 400, 500 in FIGS. 3-5), a disk 104 physically contacting and supported by at least one mounting surface (not labeled in FIG. 1, 325, 425, 525 in FIGS. 3-5 respectively) of the hub 102, and a head 106 operable to write to and read from the disk 104. The hub 102 may comprises a substantially cylindrical portion 108 which define a longitudinal axis and a mounting surface substantially normal to the longitudinal axis, the mounting surface extending radially outward.

As illustrated in FIG. 1, a disk drive 100 comprises a magnetic disk drive, and the structures and methods described herein will be described in terms of such a disk drive. However, these structures and methods may also be applied to and/or implemented in other disk drives, including, e.g., optical and magneto-optical disk drives.

The disks 104 may comprise any of a variety of magnetic or optical disk media having a substantially concentric opening 114 defined there through. Of course, in other embodiments, the disk drive 100 may include more or fewer disks. For example, the disk drive 100 may include one disk or it may include two or more disks. The disks 104 each include a disk surface 116, as well as an opposing disk surface not visible in FIG. 1 above. In one embodiment, the disk surfaces 116 comprise a plurality of generally concentric tracks for storing data.

As illustrated, the hub 102 may be coupled to and support the disks 104. Specifically, the hub 102 may provide a flange (Not labeled in FIG. 1, shown in FIGS. 3-5 below). The hub 102 may also be rotatably attached to a motor base 118 of the disk drive 100, and may form one component of a motor 120 (e.g., a spindle motor). The motor 120 and the hub 102 may be configured to rotate the disks 104 about the longitudinal axis L.

Further, a disk clamp 140 may be coupled to the hub 102 to provide a downward clamping force to the disks 104. Specifically, the disk clamp 140 may be positioned above the disks 104 and attached to an upper surface of the hub 102. The interaction of the disk clamp 140 and the hub 102 to provide the downward clamping force is discussed in more detail below.

The disk drive 100 may further include a cover 122, which, together with the motor base 118, may house the disks 104 and the motor 120. The disk drive 100 may also include a head stack assembly ("HSA") 124 rotatably attached to the motor base 118. The HSA 124 may include an actuator 126 comprising an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding disk 104. The HSA 124 may further include a coil 134 through which a changing electrical current is passed during operation. The coil 134 interacts with one or more magnets 136 that are attached to the motor base 118 to form a voice coil motor ("VCM") for controllably rotating the HSA 124.

The head 106 may comprise any of a variety of heads for writing to and reading from a disk 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magneto resistive. In optical and magneto-optical recording applications, the head may also include a mirror and an objective lens for focusing laser light on to an adjacent disk surface.

The disk drive 100 may further include a printed circuit board ("PCB") (not shown). The PCB may include, inter alia, a disk drive controller for controlling read and write operations and a servo control system for generating servo control signals to position the actuator arms 130 relative to the disks 104.

Figure 2:
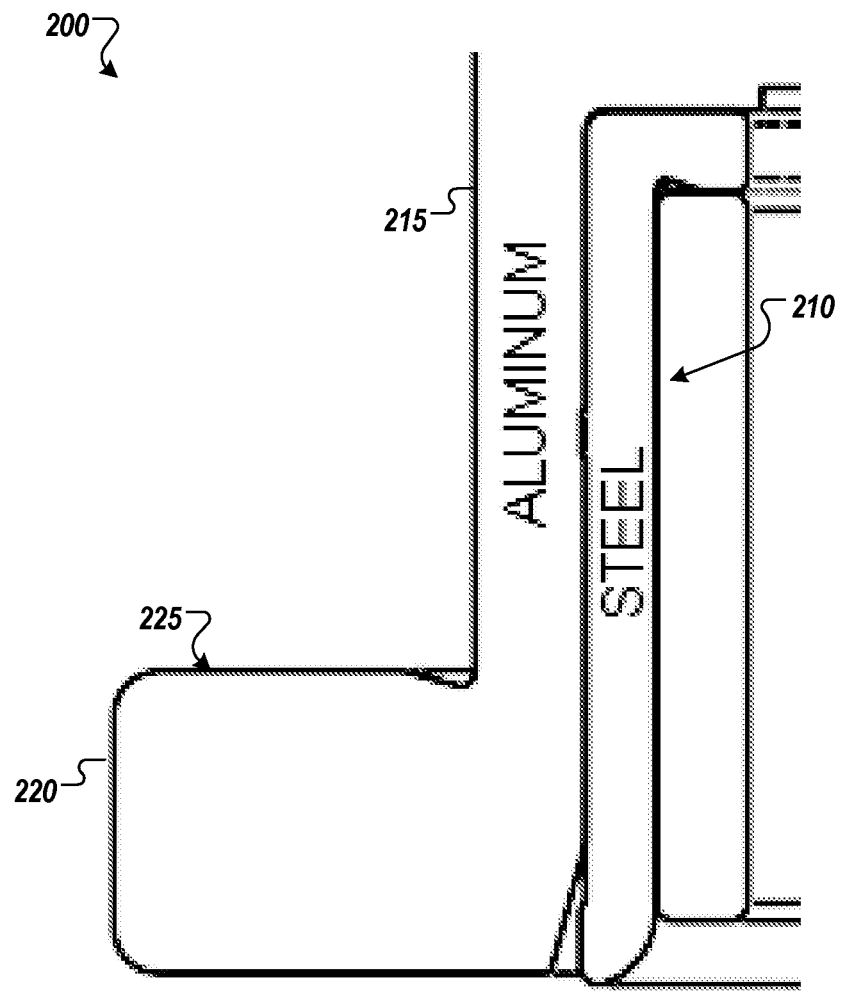
FIG. 2 illustrates a hub according to a related art design.

FIG. 2 below illustrates a hub 200 according to a related art design. As shown, the hub 200 includes a body portion 215 having a substantially cylindrical shape and a support flange 220. The substantially cylindrical shape of the body portion 215 of the hub may generally be sized to fit through the concentric opening 114 of a disk 104, such as those shown in FIG. 1. Additionally, the upper surface of the support flange 220 provides a disk mounting surface 225 configured to contact and support a disk 104 such as those shown in FIG. 1. Frequently, the hub 200 is formed from a material that can be machined or molded relatively easily, such as aluminum or plastic. In FIG. 2, the hub is shown as being machined from aluminum. Additionally, a back iron member 210 configured to block the magnetic flux of the motor from passing through the hub 200 is disposed radially inward of the hub 200. To provide this magnetic shielding, the back iron member 210 is formed of a ferromagnetic material such as iron or steel as shown in FIG. 2.

As discussed above, related art hard drives have the disks 104 clamped against the support flange 220 on the spindle motor. As the support flange 220 is formed from a material selected to be more easily machined or molded, this clamping action force can be sufficient to cause the support flange to deform the flat disk shape in an undesirable fashion. To combat this effect the motor hub flanges are designed to be thick enough to minimize these affects to manageable levels. However, increasing thickness of the support flange is not always feasible.

Figure 3:
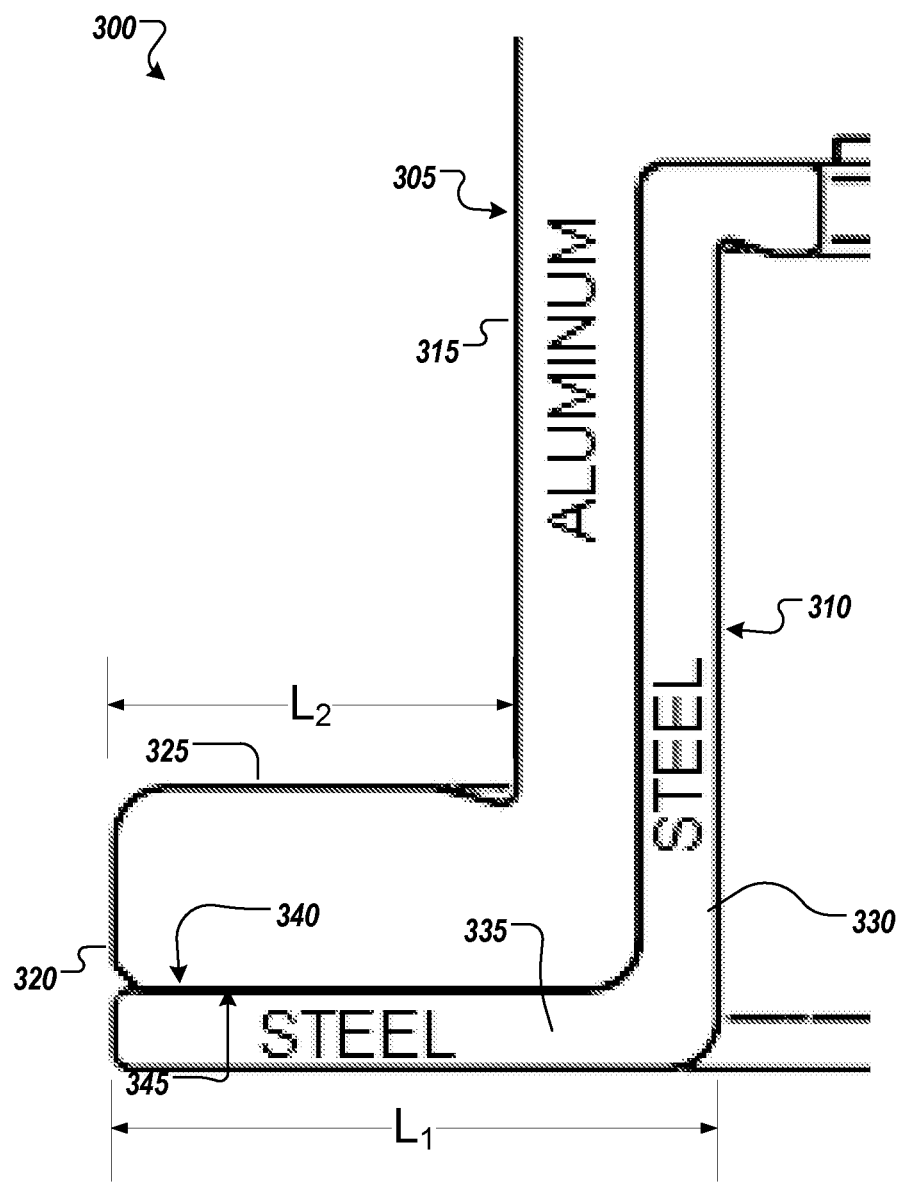
FIG. 3 illustrates a hub according to a first implementation of the present application.

FIG. 3 illustrates a hub 300 according to a first implementation of the present application. As illustrated, the hub 300 includes an upper member 305 and a lower member 310. The upper member includes a body portion 315 having a substantially cylindrical shape and a disk support portion or flange 320. The disk support portion or flange 320 extends radially outward from the body portion 315 a length $L_2$.

The substantially cylindrical shape of the body portion 315 of the hub is generally sized to fit through the concentric opening 114 of a disk 104, such as those shown in FIG. 1. Additionally, the upper surface of the disk support portion or flange 320 provides a disk mounting surface 325 configured to contact and support a disk 104, such as those shown in FIG. 1.

In this implementation, the upper member 305 is formed from aluminum, but in other implementations, the upper member 305 may be formed of other metal material(s) or non-metallic material(s) that that can be machined or molded relatively easily, such as aluminum or plastic.

The hub 300 also includes a lower member 310 comprising a main portion 330 and a support portion or flange 335. As illustrated, the support portion or flange 335 is configured to extend radially outward from a lower portion of the main portion 330 of the lower member 310 to support the disk support portion or flange 320 of the upper member 305. In some implementations, the upper surface 340 of the lower member 310 is bonded to an underside 345 of the upper member 305 to form the hub 300. The bonding of the lower member 310 to the upper member 305 to form the hub 300 may be done using a variety of techniques including bonding with adhesive, welding, press fitting or any other technique for rigidly attaching components as would be apparent to a person of ordinary skill in the art.

As illustrated, the support portion or flange 335 extends a length $L_1$ radially outward from the main portion 330. In this implementation, the length $L_1$ is such that the support portion or flange 335 extends along the entire length $L_2$ of the disk support portion or flange 320. In alternative embodiments, the support portion or flange 335 may only extend along only a portion of the length $L_2$ of the disk support portion or flange 320 or may extend beyond the length $L_2$.

In this implementation, the lower member 310 is formed of steel, but in other implementations the lower member 310 may be formed of other materials having a rigidity greater than the rigidity of the upper member 305. For example, if the upper member 305 is formed from aluminum or plastic, the lower member 310 may be formed from metal(s) or non-metallic material(s) having a rigidity greater than the rigidity of aluminum or plastic, such as carbon fiber, titanium etc.

Additionally, some implementations the lower member 310 can be formed of a ferromagnetic material, such as steel. In such implementations, the lower member 310 can function as a back iron and provide magnetic shielding configured to block the magnetic flux of the motor from passing through the hub 300. However, in other embodiments, the lower member 310 may be formed separate from a back iron piece (not shown herein).

Figure 4:
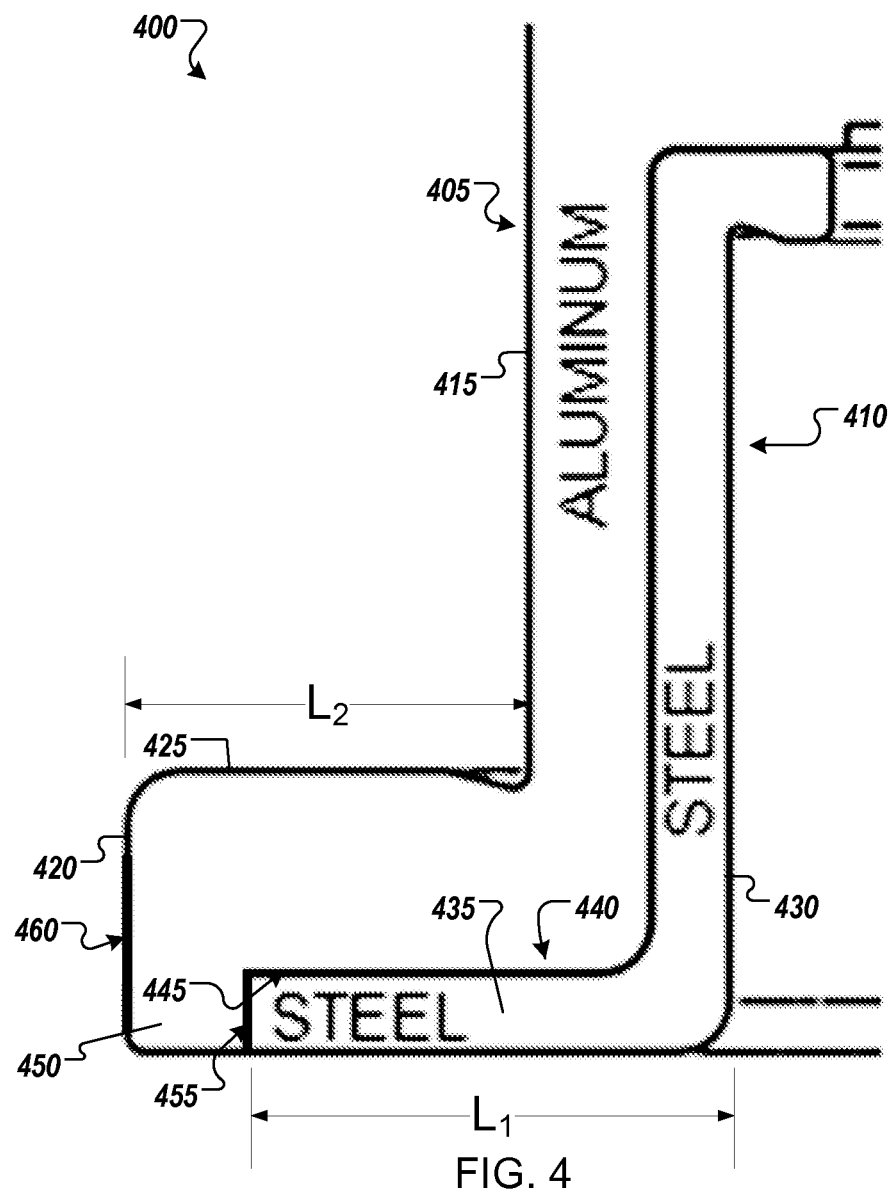
FIG. 4 illustrates a hub according to a second implementation of the present application.

FIG. 4 illustrates a hub 400 according to a second implementation of the present application. As illustrated, the hub 400 includes an upper member 405 and a lower member 410. The upper member 405 includes a body portion 415 having a substantially cylindrical shape and a disk support portion or flange 420. The disk support portion or flange 420 extends radially outward from the body portion 415 a length $L_2$.

The substantially cylindrical shape of the body portion 415 of the hub may generally be sized to fit through the concentric opening 114 of a disk 104, such as those shown in FIG. 1. Additionally, the upper surface of the disk support portion or flange 420 provides a disk mounting surface 425 configured to contact and support a disk 104, such as those shown in FIG. 1.

In this implementation, the upper member 405 is formed from aluminum, but in other implementations, the upper member 405 may be formed of other metal material(s) or non-metallic material(s) that that can be machined or molded relatively easily, such as aluminum or plastic.

The hub 400 also includes a lower member 410 comprising a main portion 430 and a support portion or flange 435. As illustrated, the support portion or flange 435 is configured to extend radially outward from a lower portion of the main portion 430 of the lower member 410 to support the disk support portion or flange 420 of the upper member 405. In some implementations, the upper surface 440 of the lower member 410 is bonded to an underside 445 of the upper member 405 to form the hub 400. The bonding of the lower member 410 to the upper member 405 to form the hub 400 may be done using a variety of techniques including bonding with adhesive, welding, press fitting or any other technique for rigidly attaching components as would be apparent to a person of ordinary skill in the art.

As illustrated, the support portion or flange 435 extends a length $L_1$ radially outward from the main portion 430. In this implementation, the length $L_1$ is such that the support portion or flange 435 extends along only a portion of the entire length $L_2$ of the disk support portion or flange 420. A lower, outer portion 450 of the upper member is disposed radially outward of the radially outer edge 455 of the support portion or flange 435 of the lower member 410. In alternative embodiments, the support portion or flange 435 may extend along the entire length $L_2$ of the disk support portion or flange 420 of the upper member 405 or may extend beyond the radially outer-most portion 460 of the upper member 405.

In this implementation, the lower member 410 is formed of steel, but in other implementations the lower member 410 may be formed of other materials having a rigidity greater than the rigidity of the upper member 405. For example, if the upper member 405 is formed from aluminum or plastic, the lower member 410 may be formed from metal(s) or non-metallic material(s) having a rigidity greater than the rigidity of aluminum or plastic, such as carbon fiber, titanium etc.

Additionally, in some implementations, the lower member 410 can be formed of a ferromagnetic material, such as steel. In such implementations, the lower member 410 can function as a back iron and provide magnetic shielding configured to block the magnetic flux of the motor from passing through the hub. However, in other embodiments, the lower member 410 may be formed separate from a back iron piece (not shown herein).

Figure 5:
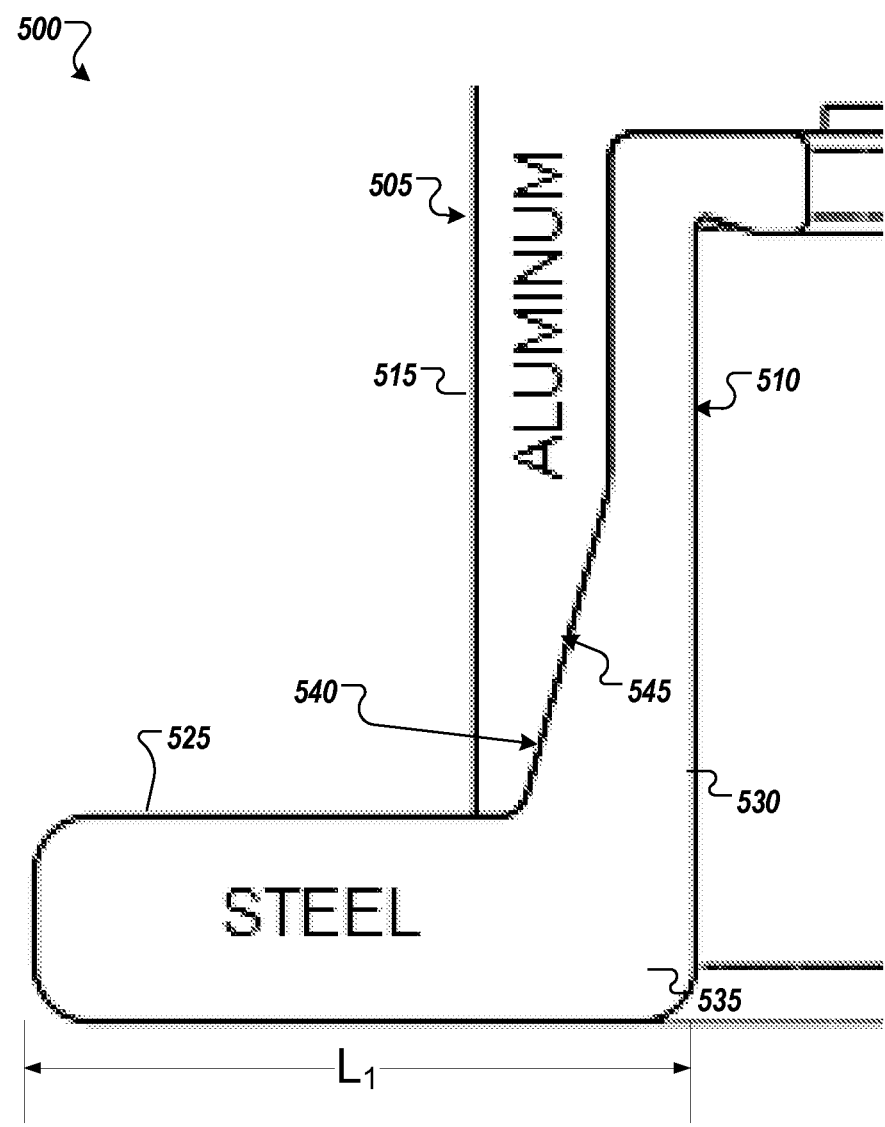
FIG. 5 illustrates a hub according to a third implementation of the present application.

FIG. 5 illustrates a hub 500 according to a third implementation of the present application. As illustrated, the hub 500 includes an upper member 505 and a lower member 510. Like the above discussed implementations, the upper member 505 includes a body portion 515 having a substantially cylindrical shape. The substantially cylindrical shape of the body portion 515 of the hub 500 is generally sized to fit through the concentric opening 114 of a disk 104, such as those shown in FIG. 1. However, unlike the implementations discussed above, the upper member 505 does not include a disk support portion or flange.

In this implementation, the upper member 505 is formed from aluminum, but in other implementations, the upper member 505 may be formed of other metal materials or a non-metallic material that that can be machined or molded relatively easily, such as aluminum or plastic.

The hub 500 also includes a lower member 510 comprising a main portion 530 and a disk support portion or flange 535. As illustrated, the disk support portion or flange 535 is configured to extend radially outward from a lower portion of the main portion 530 of the lower member 510. Additionally, the upper surface of the disk support portion or flange 535 provides a disk mounting surface 525 configured to contact and support a disk 104, such as those shown in FIG. 1.

In some implementations, the upper surface 540 of the lower member 510 is bonded to an underside 545 of the upper member 505 to form the hub 500. The bonding of the lower member 510 to the upper member 505 to form the hub 500 may be done using a variety of techniques including bonding with adhesive, welding, press fitting or any other technique for rigidly attaching components as would be apparent to a person of ordinary skill in the art.

As illustrated, the disk support portion or flange 535 extends a length $L_1$ radially outward from the main portion 530. In this implementation, the length $L_1$ is such that the disk support portion or flange 535 extends beyond the entire length of the body portion 515 of the upper member 505. As discussed above in alternative implementations, the length $L_1$ of the disk support portion or flange 535 of the lower member 510 may vary and be shorter than or the same length as a component of the upper member 505.

In this implementation, the lower member 510 is formed of steel, but in other implementations the lower member 510 may be formed of other materials having a rigidity greater than the rigidity of the upper member 505. For example, if the upper member 505 is formed of aluminum or plastic, the lower member 510 may be formed from metal(s) or non-metallic material(s) having a rigidity greater than the rigidity of aluminum or plastic such as carbon fiber, titanium etc.

Additionally, in some implementations the lower member 510 can be formed of a ferromagnetic material, such as steel. In such implementations, the lower member 510 can function as a back iron and provide magnetic shielding configured to block the magnetic flux of the motor from passing through the hub. However, in other embodiments, the lower member 510 may be formed separate from a back iron piece (not shown herein).

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection.

The invention claimed is:

1. A hub for a disk drive assembly comprising:
   an upper member formed of a first material; and
   a lower member comprising a main portion and a support flange extending radially outward from the main portion, wherein the lower member is formed from a second material and is configured to support and reinforce the upper member,
   wherein the second material having a rigidity greater than the rigidity of the first material.

2. The hub of claim 1, wherein the upper member comprises a body portion and a disk supporting flange extending radially outward from the body portion; and
   wherein the main portion of the lower member supports the disk supporting portion of the upper member.

3. The hub of claim 2, wherein the support flange of the lower member extends from main portion of the lower member a length, $l_1$, substantially equal to the length of the disk supporting portion of the upper member.

4. The hub of claim 2, wherein the support flange of the lower member extends from main portion of the lower member a length, $l_1$, less than the length of the disk supporting portion of the upper member.

5. The hub of claim 1, wherein the upper member comprises a body portion; and
   wherein the support flange extends radially outward past the body portion of the upper member to form a disk supporting portion.

6. The hub of claim 1, wherein the first material comprises a non-metallic material.

7. The hub of claim 1, wherein the first material comprises aluminum.

8. The hub of claim 1, wherein the second material comprises a ferromagnetic material.

9. The hub of claim 1, wherein the second comprises metallic material.

10. The hub of claim 1, wherein the upper member and lower member are bonded to each other via an adhesive.

11. A disk drive assembly comprising:
    a hub comprising:
       an upper member formed of a first material; and
       a lower member formed from a second material configured to support and reinforce the upper member,
       wherein the second material having a rigidity greater than the rigidity of the first material;
    a disk media configured to be mounted onto the hub; and
    a clamping mechanism configured to attach to the hub and provide a clamping force to the disk media.

12. The disk drive assembly of claim 11, wherein the upper member of the hub comprises a body portion and a disk supporting portion extending radially outward from the body portion; and
    wherein the lower member of the hub comprises a main portion and a support flange extending radially outward from the main portion, such that the main portion of the lower member supports the disk supporting portion of the upper member.

13. The disk drive assembly of claim 12, wherein the support flange of the lower member of the hub extends from main portion of the lower member a length, $l_1$, substantially equal to the length of the disk supporting portion of the upper member of the hub.

14. The disk drive assembly of claim 12, wherein the support flange of the lower member of the hub extends from main portion of the lower member a length, $l_1$, less than the length of the disk supporting portion of the upper member of the hub.

15. The disk drive assembly of claim 11, wherein the upper member of the hub comprises a body portion; and
    wherein the lower member of the hub comprises a main portion and a support flange extending radially outward from the main portion, wherein the support flange extends radially outward past the body portion of the upper member to form a disk supporting portion.

16. The disk drive assembly of claim 11, wherein the first material comprises a non-metallic material.

17. The disk drive assembly of claim 11, wherein the first material comprises aluminum.

18. The disk drive assembly of claim 11, wherein the second material comprises a ferromagnetic material.

19. The disk drive assembly of claim 18, wherein the second material comprises a metallic material.

20. The disk drive assembly of claim 11, wherein the upper member and lower member are bonded to each other via an adhesive.

* * * * *